US006227490B1

United States Patent
Marcellus

(10) Patent No.: US 6,227,490 B1
(45) Date of Patent: May 8, 2001

(54) AIRCRAFT LAVATORY FLUID LEAKAGE PREVENTION SYSTEM, OR ANTI-BLUE ICING SYSTEM

(76) Inventor: Michael Marcellus, 310 Mayfair Dr., Aurora, IL (US) 60504

( * ) Notice: Subject to any disclaimer, the term of this patent is extended or adjusted under 35 U.S.C. 154(b) by 0 days.

(21) Appl. No.: 09/305,150

(22) Filed: May 4, 1999

(51) Int. Cl.[7] ................................................. B64D 11/02
(52) U.S. Cl. ...................... 244/129.1; 4/321; 244/118.5
(58) Field of Search .................. 4/316, 323, 321, 4/317; 222/109, 108; 137/313, 312; 141/120, 121; 244/118.5, 129.1

(56) References Cited

U.S. PATENT DOCUMENTS

| | | | |
|---|---|---|---|
| 4,070,714 | * | 1/1978 | Bishton, Jr. et al. ..................... 4/318 |
| 4,114,203 | * | 9/1978 | Carolan .................................... 4/323 |
| 4,787,772 | * | 11/1988 | Wagner ................................. 137/312 |
| 5,115,520 | * | 5/1992 | Colebrook et al. ...................... 4/323 |
| 5,372,710 | * | 12/1994 | Frank ................................. 244/118.5 |
| 6,012,678 | * | 1/2000 | Hale et al. ......................... 244/118.5 |

\* cited by examiner

*Primary Examiner*—Galen L. Barefoot
(74) *Attorney, Agent, or Firm*—Daniel L. Dawes, Esq.; Myers, Dawes & Andras LLP

(57) ABSTRACT

Blue icing can be prevented by an apparatus inside an aircraft. A sump is provided which has a removable screen cover disposed over an open-top container. The sump is placed underneath the aircraft's service valve, between the service valve and service door, to collect leaked aircraft lavatory fluid. A level sensor switch placed on an interior wall of the container senses the level of the fluid in the sump and activates a pump inside the sump when the fluid reaches a predetermined level. A recirculation loop has a recirculation hose in circuit with a one-way valve. The activated pump pumps the fluid through the recirculation loop. The recirculation loop leads to a three-port fluid return fitting, allowing the pumped fluid to return to the lavatory fluid reservoir. The fluid return fitting connects to the recirculation hose, lavatory fluid reservoir and to a vent hose equilibrating the pressure within the reservoir with the ambient pressure of the aircraft's interior. Each of the three ports of the return fitting communicates with each other.

16 Claims, 3 Drawing Sheets

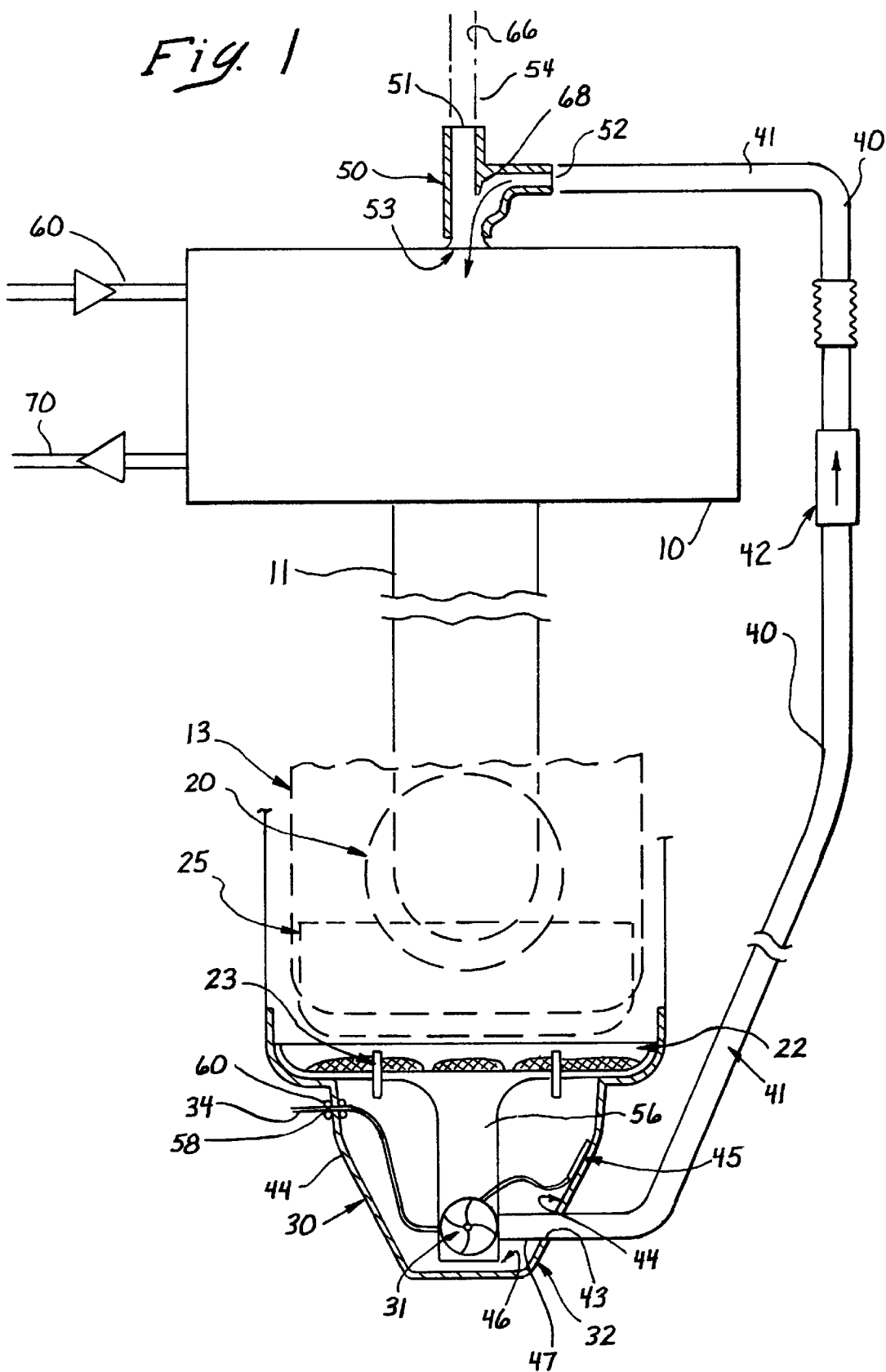

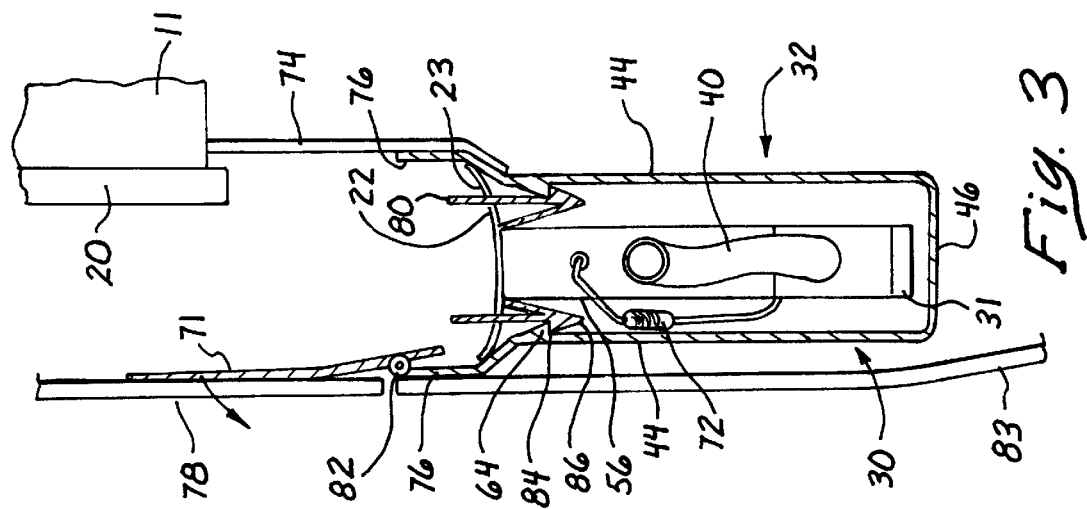
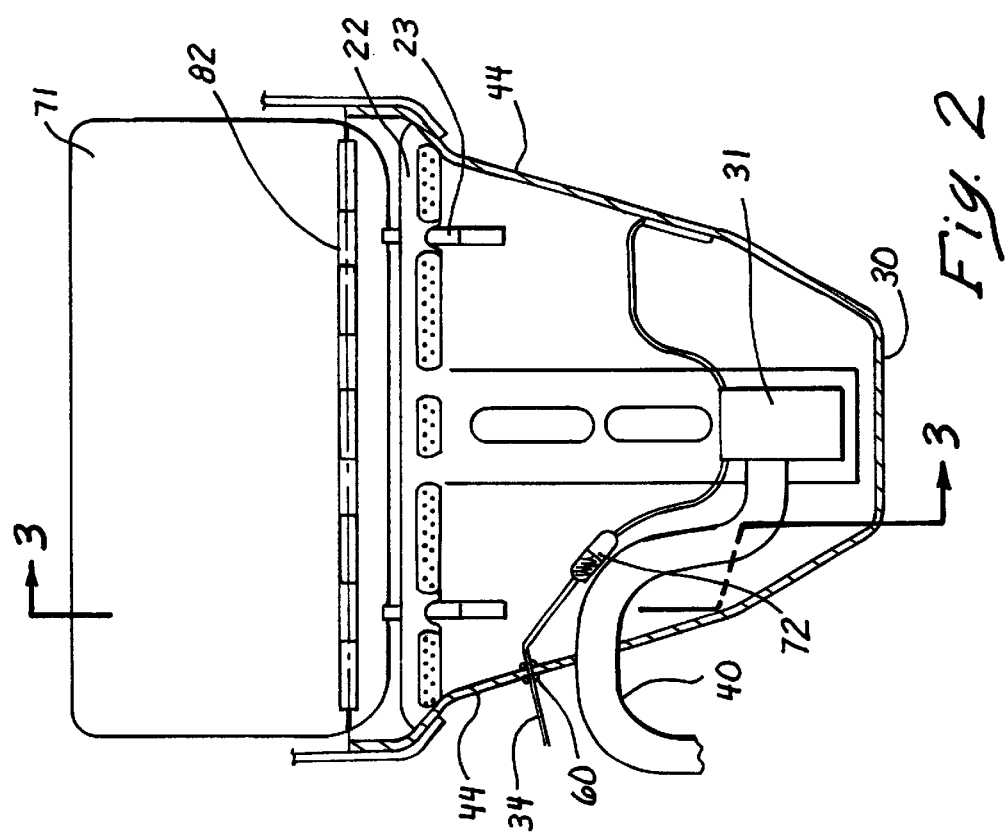

AIRCRAFT LAVATORY FLUID LEAKAGE PREVENTION SYSTEM, OR ANTI-BLUE ICING SYSTEM

BACKGROUND OF THE INVENTION

1. Field of the Invention

The invention relates to the field of the prevention of lavatory fluid leakage in connection with aircraft in flight where blue ice forms on aircraft surfaces.

2. Description of Prior Art

Aircraft that contain in-flight lavatory systems usually experience what is known as a "blue icing" condition. When the aircraft is in flight, air inside the aircraft is pressurized. At high altitudes, the outside air pressure is much lower and the air temperature is much colder than the inside air pressure and temperature of the aircraft causing a pressure differential and a temperature gradient. Any water that is disposed on the aircraft skin, whether if be from atmospheric accumulation or from leakage from inside the aircraft immediately freezes and accumulates in a mass on the aircraft skin.

Aircraft with lavatories contain a lavatory fluid reservoir which serves as the depository for all lavatory fluid and waste going to and from the lavatory or lavatories of the aircraft. A disposal hose connects from the lavatory fluid reservoir to a service valve located near the service door of the aircraft. When the aircraft has landed, the lavatory fluid and waste in the lavatory fluid reservoir can be removed from the reservoir by a suction hose of a service truck which is connected by ground crews to the service valve. In flight, the service valve along with the service door are shut and sealed.

Despite the service valve and service door being shut during flight, and despite the attempt to provide leak-proof seals, the differential in air pressure once the aircraft is in flight causes lavatory fluid to leak out of the service valve and pool around the inside base of the service door. The constant expansion and contraction of the aircraft and all of its parts with each take off and landing cycle due both to temperature and pressure cycling makes the retention of a leak-proof seal at the service valve and door impossible. The repeated rough handling of the service valve and door and their seals by repeated access by the ground crew also contributes to the comprise of the seal integrity. Sooner or later the occurrence of a leak of the lavatory fluid through the seal of the service valve and door will occur.

The fluid then leaks through the service valve and eventually through the service door. After leaking through the seal on the service door to the outer surface of the aircraft near the lower edge of the service door, a blue ice chunk or frozen solid mass of lavatory fluid results because of the cold outside air temperatures. The name "blue icing" comes from the fact that the frozen lavatory fluid has an additive for odor and sanitation, which is usually blue in color.

Blue ice has fallen from aircraft to the ground and unto homes, causing severe damage to structures and automobiles which have been hit and putting persons at jeopardy to injury. Even more often, depending in part on the proximity of the service door to the engine intakes, blue ice can and has entered jet engines resulting in engine failures and in some cases the destruction and physical detachment of the entire engine from the aircraft, not only jeopardizing land-based property and life, but also airborne property and life.

Therefore, what is needed is an apparatus and a method by which lavatory fluid can be prevented from leaking through the service door and, eventually, becoming blue ice.

BRIEF SUMMARY OF THE INVENTION

The invention is an apparatus and a method for preventing aircraft lavatory fluid from leaking out of the service door during flight and, consequently, becoming frozen on the outer surface of the aircraft.

The invention is an apparatus of interconnected devices working together to collect aircraft lavatory fluid leaking or escaping out from the service valve during flight and returning the lavatory fluid back for use, thus preventing any aircraft lavatory fluid from pooling around the inside base of the service door.

The system comprises a sump placed directly beneath the service valve. The pump comprises a container with an open top face and inner walls, such as a scupper pan, and a removable screen cover, which serves as a lid to the container. The removable screen cover, which is attached to the top of the container by quick-release latches, serves to filter out debris and solid matter from the lavatory fluid leaking from the service valve.

Inside the sump is a pump. The pump is attached to a bottom side of the removable screen cover. The pump need not be attached to the removable screen cover or to any particular part of the pump as long as the pump is located within the pump. The pump is powered via a power line that passes through the wall of the container. The pump may be any type of pump. Attached on an inner wall of the container near the top is a level sensor switch. The level sensor switch senses the level of the lavatory fluid in the container. Once the level rises to a predetermined level, the level sensor switch activates the pump.

The scope of the invention also encompasses any type of sensor, such as a weight sensor, which will activate the pump once the sump contains a predetermined amount of aircraft lavatory fluid.

The pump then pushes the lavatory fluid through a recirculation loop. The recirculation loop comprises a hose in circuit with a one-way valve to prevent back flow of the lavatory fluid. Attached on the opposite end of the recirculation loop is a fluid return fitting, shaped like a "T", which has three ports, a top port, a middle port and a bottom port. Each of the top, bottom and middle ports of the fitting communicates with each other. The middle port connects to the recirculation hose. The bottom port of the fluid return valve connects to the lavatory fluid reservoir, allowing the lavatory fluid from the recirculation loop to return to the lavatory fluid reservoir. The top port of the fluid return valve connects to a vent hose that allows air pressure within the lavatory fluid reservoir to be equalized with the air pressure of the rest of the aircraft.

The system also comprises a splash shield which is located directly outside the service valve between the service valve and the service door. Once the aircraft has landed and the service valve is accessed by a service ground crew, the splash shield serves to catch any fluid or solid waste spilling out of the service valve and directs the spill fluids and solid wastes back into the sump to where it drains. In the event that lavatory fluid is forcefully squirted through the service valve, the splash shield also serves to direct the fluid from the service door and direct it toward the pump to where it drains.

Therefore, in summary it can be appreciated that the invention is an apparatus for collecting and returning aircraft lavatory fluid leaked from a service valve in an aircraft while in flight comprising a pump for collecting aircraft lavatory fluid leaked from the service valve; a lavatory fluid reservoir communicating with the service valve; and a pump located inside the sump, the pump being communicated to the lavatory fluid reservoir to return the aircraft lavatory fluid to the lavatory fluid reservoir.

The invention can also be characterized as a method for preventing leakage of aircraft lavatory fluid from a service valve through a service door in an aircraft while in flight and preventing formation of blue ice on the outer surface of the aircraft in flight comprising the steps of providing a reservoir of aircraft lavatory fluid; collecting the aircraft lavatory fluid leaked from the service valve; and transporting the collected aircraft lavatory fluid to the lavatory fluid reservoir.

The invention now having been briefly summarized, it may be better visualized by turning to the following drawings wherein like elements are reference by like numerals.

BRIEF DESCRIPTION OF THE DRAWINGS

FIG. 1 is a schematic view of the lavatory fluid reservoir, recirculation loop, sump, service valve, fluid return fitting and the hose to aircraft lavatories and hose from aircraft lavatories.

FIG. 2 is a front diagrammatic cut-away view of the service valve, sump, pump, level switch sensor and recirculation hose.

FIG. 3 is a side cross-sectional diagrammatic view of the service valve and sump as seen through lines 3—3 of FIG. 2.

Figure 4:
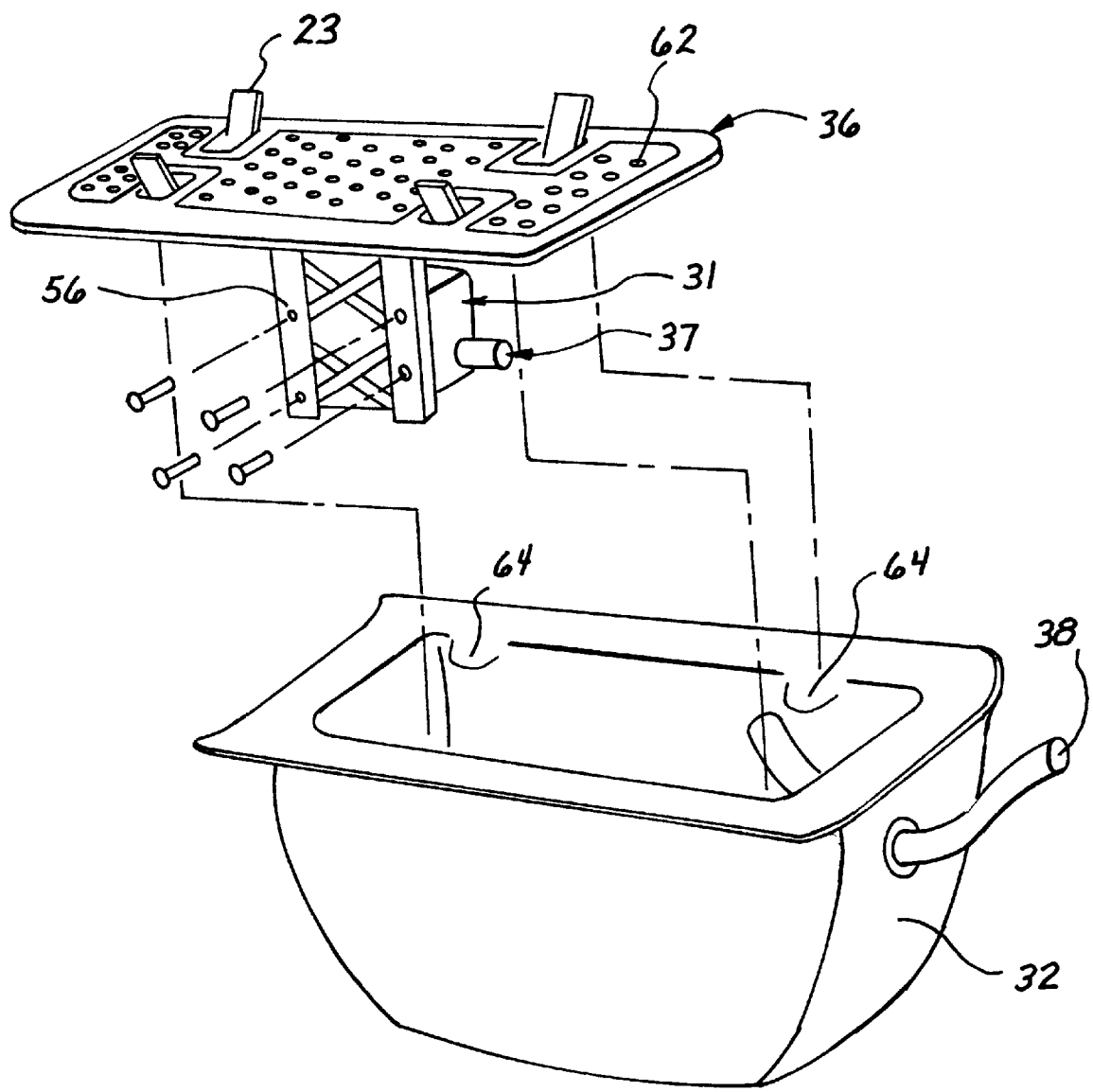
FIG. 4 is an exploded perspective view of the pump with its removable screen cover.

The invention and its various embodiments can now be better understood by turning to the following detailed description wherein an illustrated embodiment is described. It is to be expressly understood that the illustrated embodiment is set forth as an example and not by way of a limitation to the invention as defined in the following claims.

DETAILED DESCRIPTION OF THE PREFERRED EMBODIMENTS

Blue icing can be prevented by use of the invention installed inside an aircraft. A sump has a removable screen cover and an open-top container. The sump is placed underneath the aircrafts service valve between the service valve and service door to collect leaked aircraft lavatory fluid. A level sensor switch placed on an interior wall of the container senses the level of the fluid in the sump and activates a pump inside the sump when the fluid reaches a predetermined level. A recirculation loop has a recirculation hose in circuit with a one-way valve. The activated pump pumps the fluid through the recirculation loop. The recirculation loop leads to a three-port fluid return fitting, allowing the pumped fluid to return to the lavatory fluid reservoir. The fluid return fitting connects to the recirculation hose, lavatory fluid reservoir and to a vent hose equalizing the pressure within the reservoir with the ambient pressure of the aircraft's interior. Each of the three ports of the fitting communicates with each other.

FIG. 1 schematically shows the system of the invention, generally denoted by reference number 80, in connection with the lavatory fluid system of an aircraft 81, which is symbolically shown by depiction of part of its airframe or structure. Aircraft 81 may of course be any aircraft with one or more lavatories.

Aircraft 81 is provided with a lavatory fluid reservoir 10, a service valve 20, a hose 60 transporting aircraft lavatory fluid from a lavatory or lavatories (not shown of aircraft 81 to reservoir 10, a hose 70 transporting aircraft lavatory fluid from reservoir 10 to the lavatory or lavatories of aircraft 81, a disposal hose 11 transporting aircraft lavatory fluid from lavatory fluid reservoir 10 to the service valve 20.

Of course, the aircraft lavatory fluid may be any type of fluid used in connection with the transport and disposal of human waste in aircraft lavatories.

Aircraft 81 is also provided with system 80, including a pump, generally denoted by reference number 30, a recirculation loop, generally denoted by reference 40, a fluid return fitting, generally denoted by reference 50, and a vent hose 54.

FIG. 1 shown in a diagrammatic side cross-sectional view of lavatory fluid reservoir 10, fluid return fitting 50, recirculation hose 40, vent hose 54, disposal hose 11, and lavatory hoses 60 and 70. Although hoses are referenced in the illustrated embodiment any other type of conduct may be substituted. Pump 31 is connected to the recirculation loop 40. Recirculation loop 40 is comprised of a recirculation hose portion 41 in circuit with a one-way valve 42. The purpose of one-way valve 42 is to prevent any possible siphoning or backflow from recirculation loop 40 and/or reservoir 10 into pump 30 given that aircraft 81 is not always in level flight and the possibility for reverse flow exists depending on the placement of return fitting 50 and the degree of fill of reservoir 10.

On the end of the recirculation loop 40 connected to reservoir 10, recirculation hose 41 is attached to a fluid return fitting 50. Fluid return fitting 51 has three ports: a top port 51 which is attached to a vent hose 54, a middle port 52 attached to the recirculation hose portion 41, a bottom port 53 attached lavatory fluid reservoir 10. Each of the three ports of fluid return fitting 50 communicates with each other. The distal end 66 of vent hose 54 is communicated with the interior pressure in aircraft 81 so that any pressure differential between the interior of reservoir 10 and the interior of aircraft 81 is equalized to prevent a back pressure from being developed between reservoir 10 and the aircraft lavatories through lavatory hoses 60 or 70. Return fitting 50 includes a splash plate 68 so that fluid forcefully injected by pump 31 through port 52 is directed downward into reservoir 10 and deflected as much as possible from port 51 and vent hose 54. It is of course contemplated that the function of return fitting 50 could be divided between a first fitting or valve coupled to reservoir 10 at a first location and to recirculation hose portion 41 and a second fitting or valve coupled to reservoir 10 at a second location and to vent hose 54.

On the end of recirculation loop 40 connected to pump 31 a sump hose portion 47 is disposed through a fluid-tight seal (not shown) through hole 43 defined in wall 44 of container 32 and attached to intake 37 of pump 31. Sump hose portion 47 may be contiguous with recirculation loop 40 or may be a separate segment coupled thereto.

FIG. 2 is a cutaway front view of pump 30 and a splash guard 71. Sump 30 is placed beneath the service valve 20 as best shown in FIG. 3 so as to lie in the path of the natural gravity flow of any fluid leaking from service valve 20. FIG. 3 is a cutaway view of pump 30 and a frontal view of service valve 20. Sump 30 comprises a removable screen cover 22 which extends over and is attached to a container 32 by a plurality of quick-release latches 23 described below in connection with FIG. 3. The removable screen cover 22 is described in greater detail in connection with FIG. 4 below and may be flat as shown in the embodiment of FIG. 4 or curved as shown in the embodiment of FIGS. 2 and 3 to form a depending trough into container 32 to assist in the collection of solid waste. Container 32 has four side walls 44, two of which are shown in FIG. 2, and a bottom wall 46. The container 32 may be made from any nonporous, or nonabsorbing material, such as metal, plastic, ceramic or Fiberglas.

FIG. 3 is a side cross-sectional view taken through lines 3—3 of FIG. 2. FIG. 3 illustrates that sump 30 is disposed in the natural or gravity flow path of any fluids escaping from service valve 20. In the embodiment of FIG. 3 screen cover 22 is highly curved and includes ascending sides 76 which are formed to conformally fit with the existing pan 74 found in aircraft 81 adjacent to service valve 20 and service door 78. Splash guard 71 is coupled by means of a spring biased hinge 82 to the outboard ascending side 76 of screen cover 22 adjacent to aircraft skin 83. When service door 78 is opened, splash guard 71 will rotate counterclockwise in the depiction of FIG. 3 to form an outwardly extending surface of chute to catch any possible ejected fluids and waste which may flow from service valve 22 when it is opened and to direct the ejected fluids and waste back inside aircraft 81 and into pump 30. The angle of tilt of splash guard 71 may be limited by hinge 82 to remain always backwardly inclined to some degree into aircraft 81. Hinge 82 is biased so that when the service suction hoses coupled to service valve 20 are removed, splash guard 71 rotates clockwise in the depiction of FIG. 3 to the position shown to allow closure of service door 78.

Release latches 23 are shown in FIG. 3 to be descending V-shaped resilient clips or double-ended straps having one upper end of each V-shaped resilient clip fixed to bracket 56 and the other end free for compression. Just above and outboard from the apex 86 of each latch 23 is an outwardly extending spur 84 which is arranged and configured to lock in an interference fit with flange 64 extending from container 32 when latch 23 is in its outwardly extending and uncompressed configuration. When upper ends 88 of latch 23 are compressed or pushing inwardly toward the center of screen cover 22, spur 84 is drawn inwardly and disengages from its interference fit with flange 64, thereby unlocking screen cover 22 from container 32 and allowing its removal.

FIG. 4 is an exploded perspective view of sump 30 with removable screen cover 22 and container 32. Removable screen cover 22 serves as a lid for container 32 and filters out any solid matter from the aircraft lavatory fluid leaking from service valve 20. Consequently, only aircraft lavatory fluid, and not solid matter, flows through the removable screen cover 22 to be collected by the container 32. Screen cover 22 is comprised of a solid frame 36 into which a plurality of screen segments 62 have been fixed. Screen segments 62 may have any structure now known or later devised for screening such as woven wires, a fixed grating of expanded metal elements, a plurality of holes defined through solid plate, and any other type of sieve which is capable of passing fluid while straining out solid particles of a certain minimum size or greater. The purpose of screen cover 22 is to prevent any solid materials which fall into the collection area from entering sump 32 and clogging pump 31. Alternatively, it is possible to provide a screen or cage (not shown) around pump 31 or at least its intake 37 to prevent clogging. Screen cover 22 is further provided with a plurality of resiliently biased latches 23 which resiliently engage corresponding flanges 64 defined around the upper edge of container 32 so that screen cover 22 snaps into and out of engagement with container 32. In this manner, screen cover 22 may be quickly removed from sump 30 to allow servicing of pump 31 or container 32 as needed and reinstalled.

Pump 31 is attached to the bottom side of removable screen cover 22 by means of a bracket 56 such that when removable screen cover 22 is attached to the top of container 32, pump 31 is located within the container 32. The pump is a Ultra Compact ET200 pump manufactured by Flojet in Irvine, Calif. The invention encompasses any nonexplosive type pump which can pump fluid through the head between sump 30 and reservoir 10 as normally found in aircraft 81.

A level sensor switch 45 is attached on the interior of a side wall 44 in the container 32 as shown in FIG. 2. Level sensor switch 45 is a float switch, or an Electro-optical Level Sensor manufactured by GEMS located in Plainville, Conn. As aircraft lavatory fluid leaks from service valve 20, the level of fill of the collected aircraft lavatory fluid within sump 30 rises. Once the level of fill reaches a predetermined level inside sump 30 as determined by the position of level sensor switch 45 mounted on wall 44 of container 32, level sensor switch 45 electrically activates the pump 31 by closing a circuit to provide power to pump 31 on cable 34 from a conventional power bus (not shown) in aircraft 81. Cable 34 is fed through a hole 58 defined through an upper portion of wall 44 of container 32 and is seal by a feed-through plug 60 which is compression fit into hole 58. Cable 34 is spliced at a point between hole 58 and pump 31 by a waterproof connector 72, which allows cable 34 to be disconnected from pump 31 and allows pump 31 to then be completely removed from sump 30.

Of course, the invention encompasses any type level sensor switch which has the capacity to sense the level of fill of fluid within a container and activate a pump, and is not limited to float switches. The invention also encompasses different types of sensor switches beyond level sensor switches. For example, sensor switch 45 may be a mass sensor switch, which activates pump 31 once a predetermined mass of fluid has been disposed in sump 30 or which detects the wetness or conductivity of the fluid when in contact with sensor switch 45. Sensor switch 45 may be any type of sensor, which has the capacity to sense or measure the amount of fluid in a container and to activate a pump once a predetermined amount has been reached.

The structure of system 80 now having been described, turn now to its operation. When the aircraft is in operation fluid leaks from service port 50 and is collected in the area of screen cover 22. The fluid drains through screen cover 22 while solid materials are retained on top of screen cover 22. The fluid collects in the bottom of container 32. Pump 31 remains inactivated until the fluid reaches the level of switch 45. When the fluid reaches the level of switch 45, pump 31 is turned on. When activated, pump 31 pumps any aircraft lavatory fluid collected in sump 30 through recirculation loop 40 through one-way 42 to fluid return fitting 50 and into reservoir 10. Fluid in reservoir 10 is screened or filtered by conventional means not shown and pumped out of reservoir 10 for use in the aircraft lavatories. The fluid is then returned to reservoir 10 from the aircraft lavatories burdened by the added waste. Switch 45 typically has a hysteresis cycling, namely switch 45 is activated when the fluid in container 32 achieves a predetermined activation or maximum level of fill. Pump 31 then starts pumping and the level of fill begins to drop. Switch 45, however, remains closed for a period of time or over an interval of fill before it opens. The level of fill then drops to a lower inactivation or minimum level of fill. Pump 31 is thus continually cycled between a maximum and minimum level of fill as leakage continues.

The leaked fluid from service valve 20 is pumped through fluid return fitting 50 through the middle port 52 and moves downward through bottom port 53 back to lavatory fluid reservoir 10. The top port 51 connects to a vent hose 54. The vent hose 54 vents to the ambient interior pressure of the aircraft 81, thus equilibrating the air pressure within the lavatory fluid reservoir 10 to the ambient interior pressure of the aircraft 81 and providing both make up air and expelled air as the fluid level in reservoir 10 changes.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. An apparatus for collecting and returning aircraft lavatory fluid leaked from a service valve in an aircraft while in flight comprising:

a sump for collecting aircraft lavatory fluid leaked from said service valve;
 a lavatory fluid reservoir communicating with said service valve; and
 a pump located inside said sump, said pump being communicated to said lavatory fluid reservoir to return said aircraft lavatory fluid to said lavatory fluid reservoir.

2. The apparatus of claim 1 wherein said pump comprises an open face container and a removable top screen cover which has a bottom side, wherein said pump is attached on said bottom side of said removable top screen cover.

3. The apparatus of claim 1 wherein said collected aircraft lavatory fluid is characterized by a level of fill in said pump, further comprising a level sensor switch located inside said pump, wherein said level sensor switch senses said level of aircraft lavatory fluid in said pump and activates said pump once said aircraft lavatory fluid in said pump reaches a predetermined level.

4. The apparatus of claim 1 further comprising a service door in said aircraft and a splash shield placed between said service valve and said service door.

5. The apparatus of claim 1 further comprising a fluid return fitting with a top port, bottom port and middle port, wherein each of said top, bottom and middle ports communicates with each other, said aircraft having an ambient interior pressure, said top port venting to said ambient interior pressure within said aircraft, said middle port communicating with said pump, and said bottom port communicating with said lavatory fluid reservoir.

6. The apparatus of claim 5 further comprising a recirculation loop joining said pump to said fluid return fitting.

7. The apparatus of claim 6 wherein said recirculation loop comprises a one-way valve and a hose in circuit with said one-way valve, said one-way valve allowing flow of said collected aircraft lavatory fluid from said pump to said fluid return fitting.

8. The apparatus of claim 7 further comprising a vent hose, said top port of said fluid return fitting is attached to said vent hose, said middle port of said fluid return fitting is attached to said recirculation loop, and said bottom port of said fluid return fitting is attached to said lavatory fluid reservoir.

9. A method for preventing leakage of aircraft lavatory fluid from a service valve through a service door in an aircraft while in flight and preventing formation of blue ice on the outer surface of said aircraft in flight comprising:

providing a reservoir of aircraft lavatory fluid;
 collecting said aircraft lavatory fluid leaked from said service valve; and
 transporting said collected aircraft lavatory fluid to said lavatory fluid reservoir.

10. The method of claim 9 wherein transporting said collected aircraft lavatory fluid comprises pumping said collected aircraft lavatory fluid leaked from said service valve.

11. The method of claim 9 further comprising providing a sump and a pump, wherein collecting said aircraft lavatory fluid leaked from said service valve comprises collecting said aircraft lavatory fluid in said sump, wherein said collected aircraft lavatory fluid is characterized by a level of fill in said sump, wherein said pump is provided with said pump, and further comprising sensing said level of fill of said collected aircraft lavatory fluid in said sump and activating said pump when said collected aircraft lavatory fluid has risen to a predetermined level of fill.

12. The method of claim 9 further comprising providing a pump, wherein said service valve is accessed once said aircraft is landed, wherein collecting said aircraft lavatory fluid leaked from said service valve comprises collecting said aircraft lavatory fluid in said pump, further comprising catching said aircraft lavatory fluid splashed from said service valve and drawing said aircraft lavatory fluid downwards toward said sump.

13. The method of claim 9 further comprising providing a sump, a recirculation hose and a fluid return fitting, wherein collecting said aircraft lavatory fluid leaked from said service valve comprises collecting said aircraft lavatory fluid in a sump, wherein transporting said collected aircraft lavatory fluid to said lavatory fluid reservoir comprises pumping said collected aircraft lavatory fluid in said sump through said recirculation hose attached to said fluid return fitting.

14. The method of claim 13 further comprising using said fluid return fitting to transport said aircraft lavatory fluid to said lavatory fluid reservoir.

15. The method of claim 14 further comprising providing a one-way valve and transporting said aircraft lavatory fluid from said sump to said fluid return fitting in a unilateral direction through use of said recirculation hose in circuit with said one-way valve preventing backflow of said aircraft lavatory fluid.

16. The method of claim 15 further comprising providing a vent hose, wherein using said fluid return fitting to transport said aircraft lavatory fluid to said lavatory fluid reservoir comprises using said vent hose, said aircraft having an ambient interior pressure, said lavatory fluid reservoir having an inside air pressure, further comprising equilibrating said inside air pressure of said lavatory fluid reservoir to said ambient interior pressure within said aircraft through use of said fluid return fitting attached to said vent hose.

* * * * *